United States Patent Office

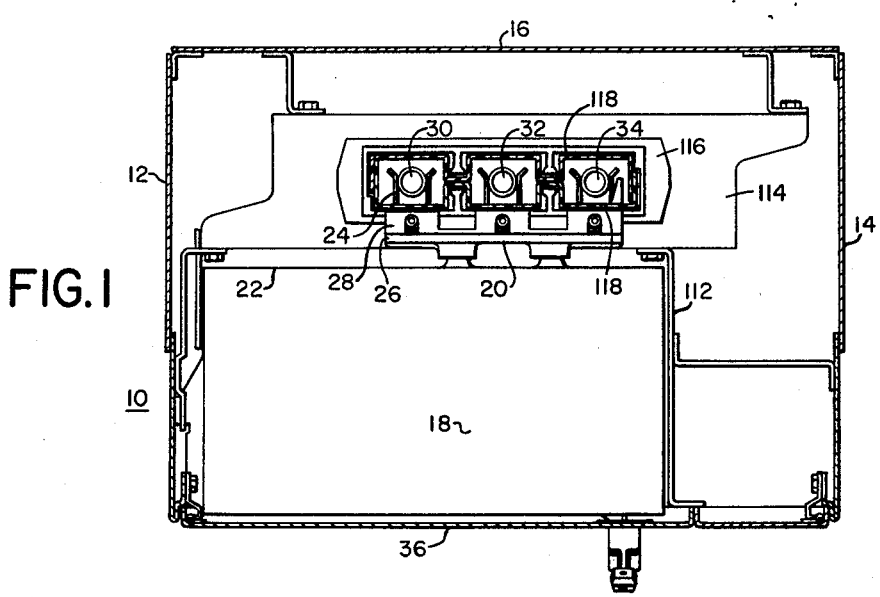
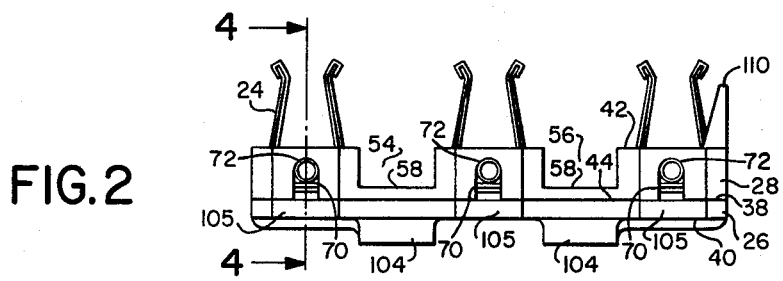
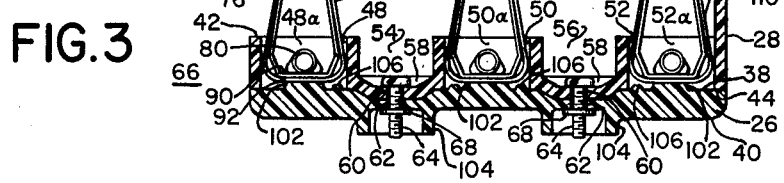
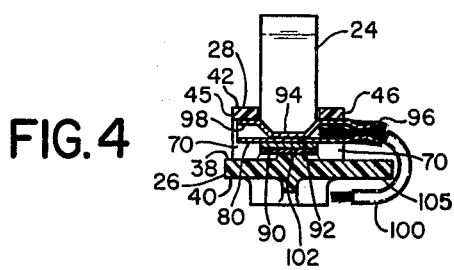
INVENTOR.
FRED J. CINATL
LEWIS M. LEHMAN

3,478,299
Patented Nov. 11, 1969

3,478,299
ELECTRICAL CONNECTOR ASSEMBLY FOR THE VERTICAL BUS BARS IN A CONTROL CENTER CABINET SECTION
Fred J. Cinatl, and Lewis M. Lehman, Milwaukee, Wis., assignors to Square D Company, Park Ridge, Ill., a corporation of Michigan
Filed Jan. 29, 1968, Ser. No. 701,329
Int. Cl. H01r 9/22, 11/22, 13/70
U.S. Cl. 339—64                                            8 Claims

ABSTRACT OF THE DISCLOSURE

An electrical connector assembly for the vertical bus bars in an electric control center cabinet section that includes a pair of molded insulating parts which are arranged to position the jaw-like connectors of the assembly so the jaw-like connectors will have a limited rocking or tilting movement on one of the pair of parts when the connector is attached to the bus bars and the forces required to detach the connector from the bus bars are exerted against the other of the pair of parts by the wire connecting portion of the jaw-like connectors.

---

This invention relates to electrical apparatus enclosures and more particularly to the structural details of a detachable vertical bus bar connector assembly in a control center cabinet section.

Devices which are used to control the distribution of electric current to a plurality of electric loads, such as a number of motors from a central location, frequently are housed in compartmented structures called control centers. As occasionally the devices, such as relays, motor starters and contactors which are housed in the control center, may require service or replacement, control centers frequently are formed of a group of individual cabinet-like sections, each of which includes a plurality of cells or compartments wherein the devices are installed. To facilitate wiring and servicing, control centers are provided with main horizontal bus bars which extend across the upper portions of all of the individual sections and are connected to deliver current from a supply to groups of vertical bus bars in each section. The vertical bus bars in turn deliver current to the devices within the individual cells through separable jaw-like connectors which make contact with the vertical bus bars in a manner illustrated in United States Patent No. 2,648,032 which was granted on Aug. 4, 1953 to Earl F. Mekelburg.

While the connectors as disclosed in the Mekelburg patent have been successfully used for many years, because the Mekelburg connectors were formed with a base of porcelain material and a large number of parts, they were both costly to manufacture and fragile. The connector according to the present invention overcomes the objectionable features inherent in the Mekelburg connectors without sacrifice of the functions achieved by the Mekelburg connectors.

It is an object of the present invention to provide an electrical connector assembly for a control center cabinet section with a pair of molded insulating parts which are arranged to position the jaw-like connectors of the assembly so the jaw-like connectors will have a limited rocking movement on one of the molded parts and are maintained in position by the wire connecting portions of each jaw-like connector and the other of said pair of molded parts.

Another object is to provide an electrical connector assembly for a control center cabinet section, which connector assembly includes a pair of molded insulating parts and a plurality of jaw-like connector assemblies which are movably positioned by the pair of molded parts to make connections with a plurality of vertical bus bars in the cabinet section when the connector assembly and bus bars are misaligned and wherein one of the molded parts absorbs the forces accompanying the connection of connectors to the bus bars and the other of the molded parts absorbs the forces accompanying the separation of the connectors from the bus bars.

A further object is to provide an electrical connector assembly for a control center cabinet which connector assembly includes a pair of molded insulating parts that when assembled will position a plurality of jaw-like connectors on a rear wall of a unit to make a connection with a plurality of spaced vertical bus bars when the unit is installed in the cabinet and wherein wire connecting portions of the jaw-like connectors movably confine the connectors between the pair of molded parts.

Further objects and features of the invention will be readily apparent to those skilled in the art from the specification and appended drawing illustrating certain preferred embodiments in which:

FIG. 1 is a cross sectional view of a control center cabinet section illustrating an electrical connector assembly according to the present invention in engagement with the vertical bus bars of the control center cabinet section.

FIG. 2 is an enlarged view of the electrical connector assembly as shown in FIG. 1.

FIG. 3 is a cross sectional view of the connector assembly shown in FIG. 2.

FIG. 4 is a cross sectional view taken along line 4—4 in FIG. 2.

Referring to FIG. 1 of the drawings, a cabinet section 10 for a control center preferably has a construction described in an application for United States patent having a Ser. No. 689,412, filed on Dec. 11, 1967 in the United States Patent Office. As disclosed in the application, which has been assigned by the inventor Kenneth L. Paape to the assignee of the present invention, the cabinet section 10 has a pair of side walls 12 and 14, a rear wall 16, and a front vertical opening which provides entry to the interior of the cabinet section 10. The interior of the cabinet section 10 is vertically divided by a plurality of unit mounting pans into a selected number of vertically stacked compartments each of which is arranged to receive a support 18 which carries switching devices, not shown, such as relays, manually operated switches, contactors, and the like. The devices carried by the supports 18 are electrically connected to an electrical connector assembly 20 carried on a rear wall 22 of the support 18. The connector assembly 20, as will be hereinafter described, is positioned on the rear wall 22 so that the spring biased jaw assemblies 24, carried by a pair of insulating members 26 and 28, clampingly engage the vertical bus bars indicated by numerals 30, 32 and 34 to make an electrical connection therewith when the support 18 is inserted into a proper position in the cabinet section 10. The cells wherein the supports 18 are installed are closed by hinged covers 36.

The electrical connector assembly 20 according to the present invention as shown in FIG. 2 includes the pair of members 26 and 28 which are molded of a suitable tracking-resistant insulating material as are well known to those skilled in the art. The member 26, which will be hereinafter referred to as a base member 26, has a front surface 38 and a rear surface 40. Similarly, the member 28, which will be hereinafter referred to as the cap member 28, has a front surface 42, a rear surface 44 and a pair of spaced side walls indicated by the numerals 45 and 46 in FIG. 4. Extending between the front surface 42 and the rear surface 44 are three rectangularly shaped bores 48, 50 and 52, which are spaced on centers equidistant with the horizontal spacing between the bus bars 30, 32 and 34. Separating the material of the cap member 28 which forms the adjacent walls of the cavities 48 and 50 and the cavities 50 and 52, are valleys 54 and 56, each having a floor 58. Extending between the floors 58 and the rear surface 44 are openings 60 which are aligned with openings 62 in the base member 26. The openings 60 and 62 provide passages for a pair of fastening screws 64 which maintain the front surface 38 of the base member 26 and the rear surface 44 of the cap member 28 in mutual engagement so that the insulating cap member 28 and the base member 26 become an insulating support assembly 66 when the screws 64 are secured by a pair of thread receiving fasteners 68 which are preferably formed of a resilient insulating material.

When the cap member 28 and the base member 26 are thus assembled, portions of the front surface 38 on the base member 26 provide an end wall for the bores 48, 50 and 52 and thereby provide the assembly 66 with three spaced rectangularly shaped cavities, designated as 48a, 50a and 52a. As most clearly shown in FIGS. 2 and 4, extending through the opposite side walls 45 and 46 into each of the cavities 48a, 50a and 52a are U-shaped notches 70. The notches 70 provide a pair of openings in the side walls 45 and 46 defining each of the cavities 48a, 50a and 52a, and are located on an axis passing through the center of the cavities 48a, 50a and 52a and the bus bars 30, 32 and 34 that extend perpendicular to the side walls 45 and 46 to provide an arcuate bight portion 72 that is spaced between the front and the rear surfaces 42 and 44 of the cap member 28.

Positioned in each of the cavities 48a, 50a and 52a is a spring biased jaw assembly 24. Each of the spring biased jaw assemblies includes a member 76 formed of spring metal material, a member 78 of a metal having a high electrical conductivity, and a member 80 formed of a tubular metal port having a high electrical conductivity. The members 76 and 78 are U-shaped and layered upon one another with the member 76 forming the outer portion of the assembly 24 and the member 78 extending within the member 76 and having outer portions of its arms 82 and 84 divergent and overlaying similar divergent portions on the ends of the arms 86 and 88 of the member 76 to maintain the members 76 and 78 assembled.. The arms 82 and 84 and the arms 86 and 88 are respectively interconnected by bight portions 90 and 92. The tubular part 80 includes a compressed portion 94 which presents a flat surface that is joined to the bight portion 90, as by welding, brazing and the like. The compressed portion 94 is formed in the part 80 to provide the part 80 with a pair of tubular ends 96 and 98 which extend into the notches 70 in the side walls 45 and 46 and thereby maintain the assemblies 24 in the respective cavities 48a, 50a and 52a. As shown in FIG. 4, the end 96 may have a greater length than the end 98 to have a portion extending externally of the wall 46 which may be crimped over a bared end of an insulating wire conductor 100 in a manner well known to those skilled in the art.

As shown in FIGS. 3 and 4, centrally located in each of the cavities 48a, 50a and 52a on the front surface of the base member 26 is a raised boss 102. The raised bosses 102 present a flat upper surface which is engaged by the bight portions 92 while ends 96 and 98 of the tubular parts 80 are positioned within the arcuate bight portions 72 of the notches 70 and permit the connector assemblies 24 to move with a tilting or rocking motion in the cavities 48a, 50a and 52a and absorb the forces accompanying the movement as the arm portions 82 and 84 are moved into engagement with the bus bars 30, 32 and 34.

During the separation of the electrical connector assembly 24 from the bus bars 30, 32 and 34, the arms of parts 76 and 78 are spread against the force generated by the spring metal part 76. The force accompanying this separation is transmitted through the bight portion 90 and the tubular part 80 to the arcuate bight portions 72 without impressing any stress on the conection between the indented portion 94 and the bight portion 90. If desired, the rear surface 40 of the base member 26 may be provided with a pair of annular bosses 104 which surround the openings 62 to present free ends which engage the rear wall 22 as the ends of the screws 64 which extend beyond the free ends of the bosses 104 are threaded into suitable openings in the wall 22 to mount the connector assembly 20 on the rear wall 22. Additionally, the base member 26 may be provided with portions 105 which extend to provide a barrier between the ends 96 and the rear wall 22 when the electrical connector assembly 20 is mounted on the rear wall 22. The portions 105 provide insulating material between the ends 96 and the rear wall 22 to increase the electrical clearance through air between the portions 96 and the rear wall 22. As shown in FIG. 3, if desired, the assembly 20 may include raised bosses 106 and the area surrounding the heads of the screws 64 may be suitably dished to increase the electrical clearance through air in a manner well known to those skilled in the art. Additionally, as shown in FIG. 3, the end wall of cavity 52a may be provided with a portion 110 that extends beyond the front surface 42 of the cap member 28. The portion 110 is provided to prevent accidental contact between the support 112 of the cabinet and the electrical conducting parts of the connector assembly 24 within the cavity 52a when the support 18 is installed and removed from the cabinet 10. The support 112 supports a metal support 114 for insulating member 116 for the bus bars as disclosed in the Paape application, supra. As shown in FIG. 1, surrounding the bus bars 30, 32 and 34 are insulating covers 118. The structure of the covers 118 as well as the advantages achieved thereby is clearly set forth in an application for United States patent, Ser. No. 689,537, filed. Dec. 11, 1967, which has been assigned by the inventors to the assignee of the present invention.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. An electric connector assembly for individually connecting a plurality of electric conductors to a plurality of hroizontally spaced vertically extending bus bars in a cabinet for electric apparatus, comprising: a base member formed of insulating material having a front surface and a rear surface, a cap member having a front surface, a rear surface and a pair of spaced side walls extending between the front and the rear surfaces, means including a pair of fasteners extending through aligned openings in the base member and the cap member for maintaining the front surface of the base member and the rear surface of the cap member in mutual engagement to provide an insulating support assembly, a plurality of spaced rectangularly shaped bores extending between the front and rear surfaces and the side walls of the cap member providing a plurality of spaced cavities in the support assembly, a pair of U-shaped notches extending through the spaced side walls of the cap member into each one of the plurality of cavities, each of said notches providing an opening through one of the pair of side walls of the cap member and extending from the front surface of the base member along an axis that is perpendicular to the side walls of the cap member through a center of one of the plurality of cavities to a bight portion that is spaced between the front surface and the rear surface of the cap member, a plurality of U-shaped jaw-like electric connectors, each of said connectors having a bight portion positioned adjacent the front surface of the base member in one of the plurality of cavities, a pair of portions extending in opposite directions from the bight portion through the pair of notches in the said one cavity with one of said pair of portions connected to a wire conductor and spaced arm portions extending external of the front wall of the cap member for electrically connecting the wire connecting portion of the connector assembly to one of the bus bars.

2. The connector assembly as recited in claim 1 including a raised boss on the front wall of the base portion in each of the cavities which is engaged by the bight portion of the jaw-like connectors to permit the bight portion to tilt in the cavity as the arm portions are moved into engagement with one of the bus bars.

3. The combination as recited in claim 1 wherein one of the plurality of cavities is located adjacent an end wall of the cap member and the end wall includes a portion extending external of the front wall of the cap member to prevent accidental contact between the jaw-like connector that is positioned in the cavity adjacent the end wall and portions of the cabinet during attachment or detachment of the connector assembly with the bus bars.

4. The connector assembly as recited in claim 1 wherein the bight portion and the arm portions of the connector are two layered metal parts with one of the two parts being formed of resilient material and the other of said two parts being formed of a high conductivity metal material.

5. The connector assembly as recited in claim 4 wherein the pair of portions extending through the notches are provided by a single tubular metal part having a central compressed portion secured to the bight portion of the conductive metal part.

6. The connector assembly as recited in claim 5 wherein the wire connecting portion is crimped to the wire conductor and the base member has portions extending to have a front wall portion spaced between the wire connecting portion and a support for the connector assembly when the rear surface of the base member is connected to the support for increasing the electrical clearance through air between the wire connecting portion and the support for the connector assembly.

7. The connector assembly as recited in claim 1 including a pair of bosses on the rear surface of the base member surrounding the aligned openings in the base member and wherein the pair of fasteners include a threaded end for attaching the connector assembly to a support for the connector assembly and devices which are electrically connected through the wire conductors to the bus bars.

8. The connector assembly as recited in claim 7 wherein the base member has portions extending to have a front wall portion spaced between the wire connecting portion and the support.

References Cited
UNITED STATES PATENTS

| | | | |
|---|---|---|---|
| 1,878,017 | 9/1932 | Steinmayer | 339—64 |
| 1,940,942 | 12/1933 | Dohrwardt | 339—64 |
| 2,604,504 | 7/1952 | Mekelburg. | |
| 3,157,452 | 11/1964 | Dorjee et al. | |
| 3,393,394 | 7/1968 | Orr | 339—64 |

DAVID J. WILLIAMOWSKY, Primary Examiner

P. C. KANNAN, Assistant Examiner

U.S. Cl. X.R.

339—22, 176, 259, 276, 278